US009388770B2

United States Patent
Tsujita et al.

(10) Patent No.: US 9,388,770 B2
(45) Date of Patent: Jul. 12, 2016

(54) EXHAUST GAS RECIRCULATION SYSTEM FOR ENGINE

(71) Applicant: MAZDA MOTOR CORPORATION, Hiroshima (JP)

(72) Inventors: Shuhei Tsujita, Hiroshima (JP); Einosuke Suekuni, Higashihiroshima (JP); Junji Umemura, Aki-gun (JP); Yuki Nabetani, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 220 days.

(21) Appl. No.: 14/052,424

(22) Filed: Oct. 11, 2013

(65) Prior Publication Data

US 2014/0109569 A1    Apr. 24, 2014

(30) Foreign Application Priority Data

Oct. 22, 2012   (JP) .................................. 2012-232680

(51) Int. Cl.
*F02B 33/44*     (2006.01)
*F02M 25/07*    (2006.01)
(Continued)

(52) U.S. Cl.
CPC ............ *F02M 25/0751* (2013.01); *F02B 37/00* (2013.01); *F02D 23/00* (2013.01); *Y02T 10/121* (2013.01); *Y02T 10/144* (2013.01)

(58) Field of Classification Search
CPC ..... F02B 37/00; F02D 23/00; F02M 25/0752; F02M 25/0707; Y02T 10/144; Y02T 10/121
USPC ............. 60/605.2, 602, 278; 123/568.12, 323
See application file for complete search history.

(56) References Cited

U.S. PATENT DOCUMENTS

2002/0043254 A1   4/2002   Iizuka et al.
2010/0037856 A1*  2/2010   Dickerson et al. ............ 123/323
(Continued)

FOREIGN PATENT DOCUMENTS

GB    1220296 A  *  1/1971   ............ F01D 17/146
JP    2000-161131 A    6/2000
(Continued)

OTHER PUBLICATIONS

An Office Action; "Notification of Reasons for Refusal," issued by the Japanese Patent Office on Jan. 19, 2016, which corresponds to Japanese Patent Application No. 2012-232680 and is related to U.S. Appl. No. 14/052,424; with English language translation.

*Primary Examiner* — Thai Ba Trieu
*Assistant Examiner* — Deming Wan
(74) *Attorney, Agent, or Firm* — Studebaker & Brackett PC

(57)   ABSTRACT

Disclosed is an exhaust gas recirculation system for an engine (1), wherein at least a downstream sub-region of a region of an exhaust passage (33) upstream of a turbine wheel (52) is divided into two sub-passages (R1, R2) by a partition wall (20*a*, 30*a*) extending along an exhaust gas flow direction. A high-speed sub-passage (R2) in the two sub-passages (R1, R2) is equipped with an openable-closable exhaust variable valve (23). The exhaust variable valve (23) is configured to be controlled to open the high-speed sub-passage (R2) when an engine speed is equal to or greater than a reference speed, and close the high-speed sub-passage (R2) when the engine speed is less than the reference speed. An inlet (60*a*) of an EGR passage (60) on the side of the exhaust passage (33) is opened to the high-speed sub-passage (R2) at a position downstream of the exhaust variable valve (23).

9 Claims, 9 Drawing Sheets

(51) Int. Cl.
*F02D 23/00* (2006.01)
*F02B 37/00* (2006.01)

(56) References Cited

U.S. PATENT DOCUMENTS

2010/0224142 A1* 9/2010 Iwamoto et al. .................. 123/3

2011/0314797 A1* 12/2011 Moravec et al. ................ 60/278

FOREIGN PATENT DOCUMENTS

| JP | 2002-122044 A | 4/2002 |
| JP | 2006-207599 A | 8/2006 |
| JP | 2008-140250 A | 1/2008 |
| JP | 2009-114991 A | 5/2009 |

* cited by examiner

EXHAUST GAS RECIRCULATION SYSTEM FOR ENGINE

TECHNICAL FIELD

The present invention relates to an exhaust gas recirculation system for an engine, and more particularly to an exhaust gas recirculation system for an engine equipped with a turbocharger.

BACKGROUND ART

Heretofore, exhaust gas recirculation (EGR) has been widely implemented in which an EGR passage is provided to communicate between an exhaust passage and an intake passage of an engine, and allow a part of exhaust gas flowing through the exhaust passage to be recirculated to the intake passage therethrough. The EGR results in increased ratio of an inert gas component (recirculated exhaust gas, i.e., EGR gas) to an intake air, so that it becomes possible to lower combustion temperature, thereby suppressing formation and emission of nitrogen oxides (NOx). In addition, a total intake gas amount can be increased while suppressing an increase in amount of oxygen, so that it becomes possible to reduce an intake negative pressure and thereby reduce pumping loss, while suppressing formation and emission of NOx.

A turbocharger has also been widely known which is designed to achieve a high engine power output by utilizing exhaust energy. The turbocharger is a mechanism in which a turbine wheel (hereinafter occasionally abbreviated as "turbine") provided in an exhaust passage and a compressor wheel (hereinafter occasionally abbreviated as "compressor") provided in an intake passage are coupled together through a coupling shaft, in such a manner that, when the turbine is rotated by a pressure of exhaust gas, the compressor is driven to compress intake air, thereby causing a rise in air charging pressure.

JP 2000-161131A discloses an engine in which an EGR passage is formed in a cylinder head, and an inlet of the EGR passage is opened to an exhaust collecting portion formed by collecting together two or more exhaust ports each extending from a respective one of a plurality of combustion chambers (paragraphs [0033] and [0034]).

JP 2009-114991A discloses an engine in which an inlet of an EGR passage is opened to a region of an exhaust passage upstream of a turbine of a turbocharger (paragraph [0061]).

Meanwhile, in the case where an inlet of an EGR passage is opened to a region of an exhaust passage upstream of a turbine of a turbocharger, as disclosed in JP 2009-114991A, a passage volume upstream of the turbine is increased, so that exhaust gas is expanded, resulting in lowering of pressure upstream of the turbine. As a result, there is a problem of lowering in turbine driving force (driving force for the turbine).

SUMMARY OF THE INVENTION

It is therefore an object of the present invention to provide an exhaust gas recirculation system for an engine, capable of suppressing a lowering in turbine driving force.

In order to achieve this object, the present invention provides an exhaust gas recirculation system for an engine, in which an EGR passage is provided to communicate between an exhaust passage and an intake passage and allow a part of exhaust gas flowing through the exhaust passage to be recirculated to the intake passage therethrough, wherein the exhaust passage is equipped with a turbine wheel of a turbocharger. At least a downstream sub-region of a region of the exhaust passage upstream of the turbine wheel is divided into two sub-passages by a partition wall extending along an exhaust gas flow direction. One of the two sub-passages is equipped with an openable-closable exhaust variable valve. The exhaust variable valve is configured to be controlled to open the one sub-passage when an engine speed is equal to or greater than a reference speed, and close the one sub-passage when the engine speed is less than the reference speed. An inlet of the EGR passage on the side of the exhaust passage is opened to the one sub-passage at a position downstream of the exhaust variable valve.

DESCRIPTION OF EMBODIMENTS (1) Configuration

Figure 1:
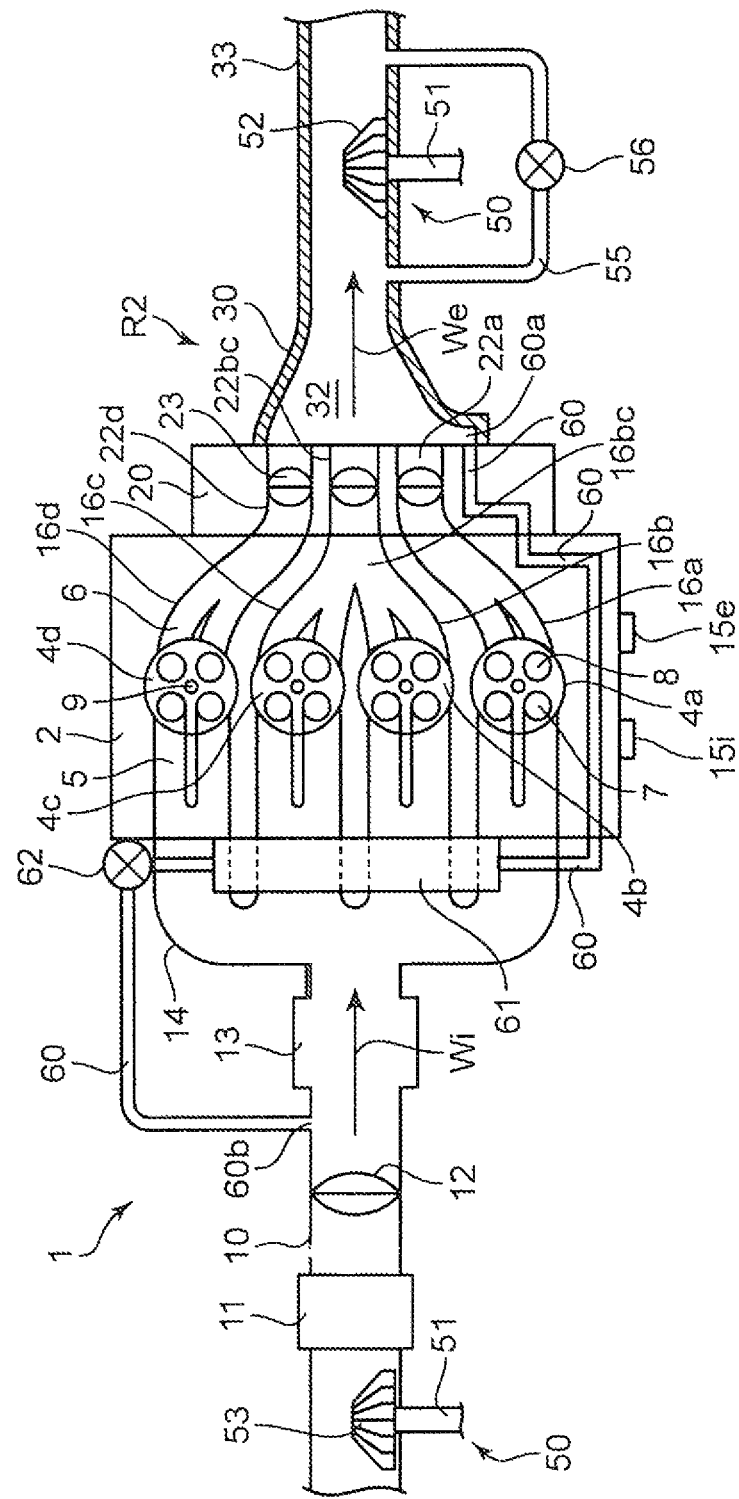
FIG. 1 is a schematic overall configuration diagram of an engine according to one embodiment of the present invention.

FIG. 1 illustrates an engine 1 according to one embodiment of the present invention. It is to be noted that FIG. 1 illustrates first to third high-speed passages 22a, 22bc, 22d in an exhaust manifold 20, and a high-speed exhaust gas introduction passage 32 in a turbocharger casing 30, as will become apparent below. As used in the following embodiment, the terms "upstream" and "downstream" is defined based on a gas stream passing through a reference position.

The engine 1 is a vehicle-mounted, in-line four-cylinder, four-stroke spark-ignited engine, and is equipped with a turbocharger 50 (i.e., is a turbocharged engine). The turbocharger 50 is a well-known mechanism in which a turbine (turbine wheel) 52 provided in an exhaust passage 33 and a compressor (compressor wheel) 53 provided in an intake passage 10 are coupled together through a coupling shaft 51. Although the turbine 52 and the compressor 53 are separately illustrated in FIG. 1 for facilitating visualization of the figure, the turbine 52 and the compressor 53 are actually provided, respectively, at one end and the other end of a single piece of coupling shaft 51. In a vicinity of an installation position of the turbocharger 50, the intake passage 10 and the exhaust passage 33 are arranged in adjacent relation to each other, and the turbocharger 50 is interposed therebetween. The turbocharger 50 is configured such that, when the turbine 52 is rotated by a pressure of exhaust gas We, the compressor 53 is driven to compress intake air Wi, thereby causing a rise in air charging pressure (the raised air charging pressure is called "boost pressure").

Figure 7:
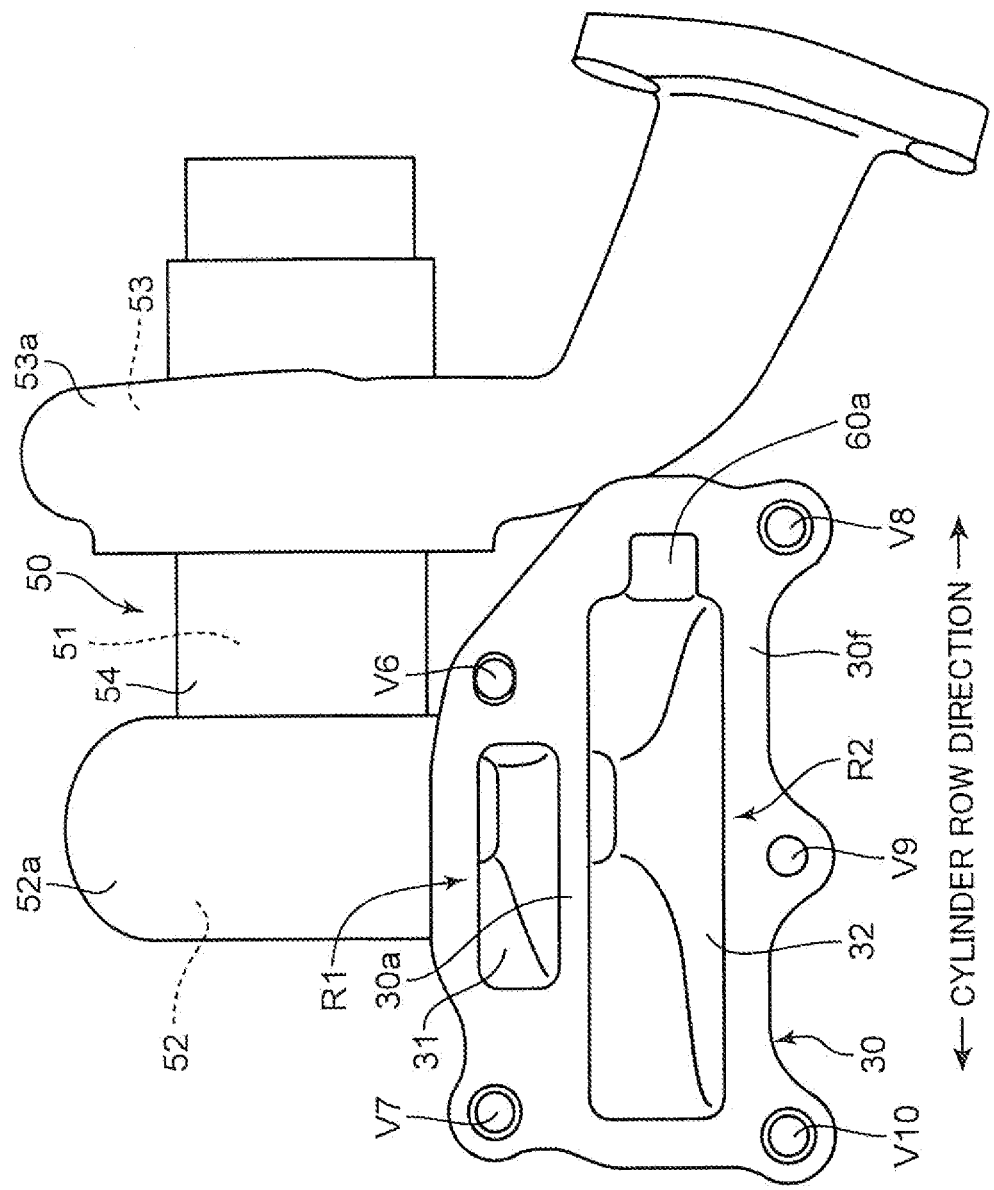
FIG. 7 is an end view of turbocharger casing when viewed from the side of the exhaust manifold, along the line VII-VII in FIG. 3.

In this embodiment, as illustrated in FIG. 7, the turbine 52, the compressor 53 and the coupling shaft 51 of the turbocharger 50 are housed, respectively, in a turbine housing 52a, a compressor housing 53a and a center housing 54. The turbine housing 52a, the compressor housing 53a, the center housing 54 and aftermentioned exhaust gas introduction passages 31, 32 are integrally combined together to form a turbocharger casing 30. The turbocharger 50 is disposed to allow an axial direction thereof to extend along a cylinder row direction of the engine.

Returning to FIG. 1, the intake passage 10 is equipped with: an intercooler 11 disposed downstream of the compressor 53 of the turbocharger 50 to cool the intake air compressed by the compressor 53; a throttle valve 12 disposed downstream of the intercooler 11 to adjust an intake air amount depending on an engine operating state; a surge tank 13 disposed downstream of the throttle valve 12 to temporarily storing intake air; and an intake manifold 14 disposed downstream of the surge tank 13 to introduce intake air into respective ones of a plurality of cylinders.

The intake manifold 14 has a downstream end connected to a cylinder head 2. An engine body primarily composed of the cylinder head 2, a cylinder block (not illustrated) and an exhaust manifold 20 has first to fourth cylinders 4a, 4b, 4c, 4d (hereinafter occasionally referred to generically as "cylinder 4") arranged in a straight line. The cylinder 4 has a well-known structure in which a portion of the cylinder head 2 located above a combustion chamber (not illustrated) defined in cooperation with a piston (not illustrated) is provided with: two intake ports 5 for introducing intake air Wi supplied from the intake manifold 14, into the combustion chamber; two exhaust ports 6 for discharging exhaust gas produced in the combustion chamber, into a corresponding one of aftermentioned three independent exhaust passages 16a, 16bc, 16d; a pair of intake valves 7 for opening and closing respective ones of the intake ports 5; and a pair of exhaust valves 8 for opening and closing respective ones of the exhaust ports 6. A spark plug 9 is provided at a top of the combustion chamber, and a fuel injection valve (not illustrated) is provided at an appropriate position to inject fuel directly into the combustion chamber.

Figure 10:
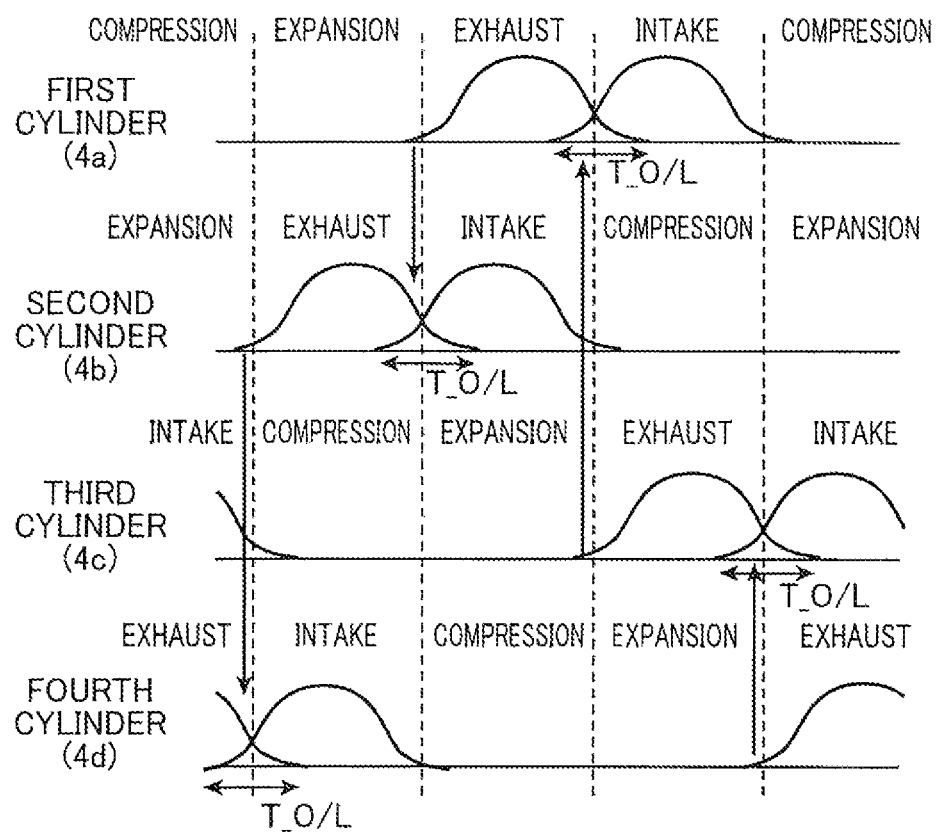
FIG. 10 is a time chart illustrating an opening-closing timing of intake and exhaust valves in the engine, on a cylinder-by-cylinder basis.

In this embodiment, a four-stroke combustion cycle consisting of intake, compression, expansion and exhaust strokes is executed in each of the four cylinders in order of the first cylinder 4a→the third cylinder 4c→the fourth cylinder 4d→the second cylinder 4b, with a phase difference of 180° CA (see FIG. 10). As used here, the "° CA" denotes a rotational angle of a crankshaft as an output shaft of the engine body (crank angle).

The exhaust passage 33 comprises: a first independent exhaust passage 16a having an upstream end connected to the two exhaust ports 6 of the first cylinder 4a; a first branch exhaust passage 16b having an upstream end connected to the two exhaust ports 6 of the second cylinder 4b; a second branch exhaust passage 16c having an upstream end connected to the two exhaust ports 6 of the third cylinder 4c; and a third independent exhaust passage 16d having an upstream end connected to the two exhaust ports 6 of the fourth cylinder 4d. The first branch exhaust passage 16b and the second branch exhaust passage 16c are joined together on a downstream side to form a second independent exhaust passage 16bc common to the second and third cylinders 4b, 4c whose exhaust strokes are not contiguous with each other. These passages 16a, 16b, 16c, 16d, 16bc are formed in the cylinder head 2. The passages 16a, 16b, 16c, 16d, 16bc are equivalent to "sub-region passing through a cylinder head" set forth in the appended claims.

Figure 2:
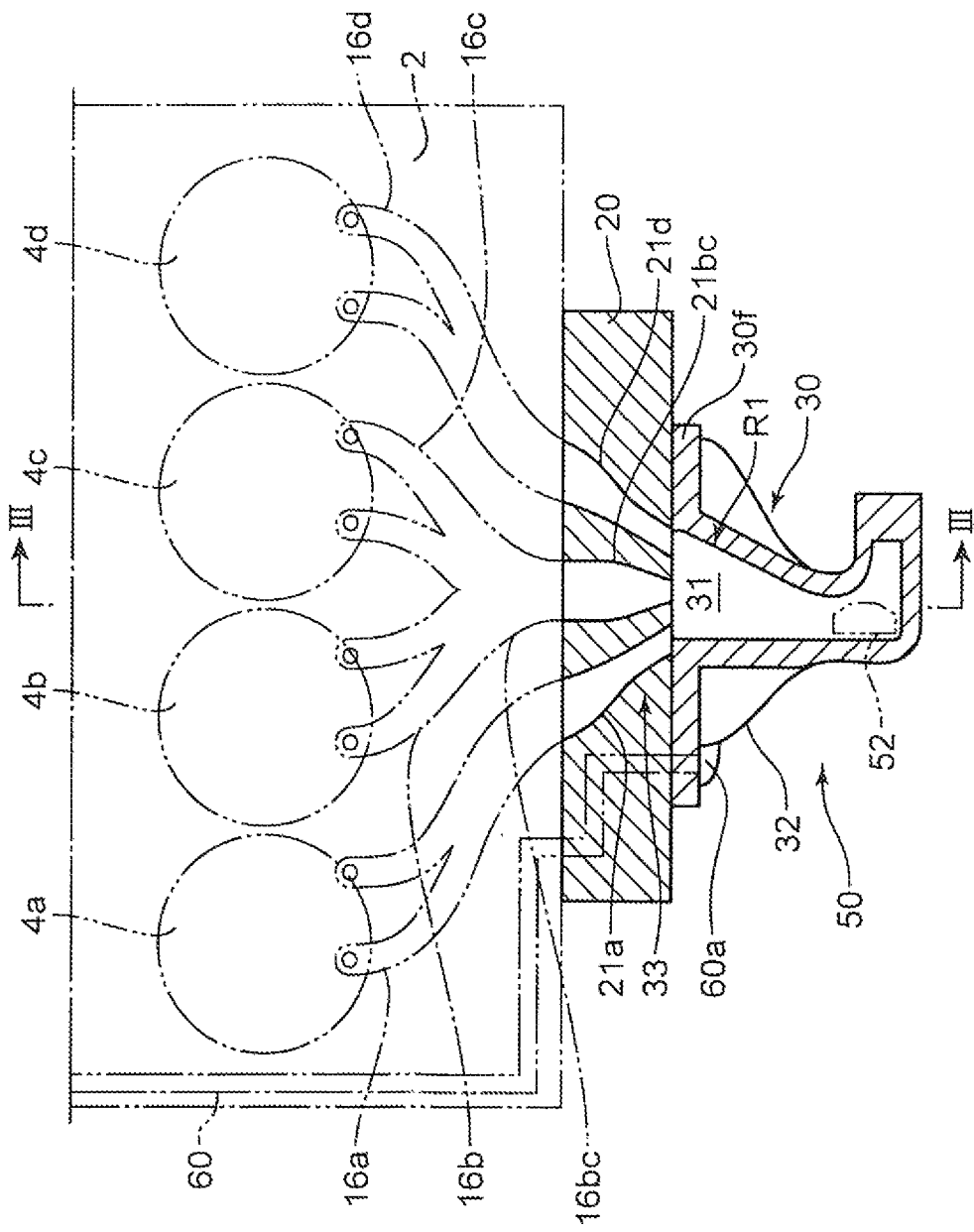
FIG. 2 is a sectional view illustrating an independent exhaust passage in a cylinder head, a low-speed passage in an exhaust manifold, a low-speed exhaust gas introduction passage, and an EGR passage extending through a turbocharger casing, the exhaust manifold and the cylinder head, in the engine.
Figure 3:
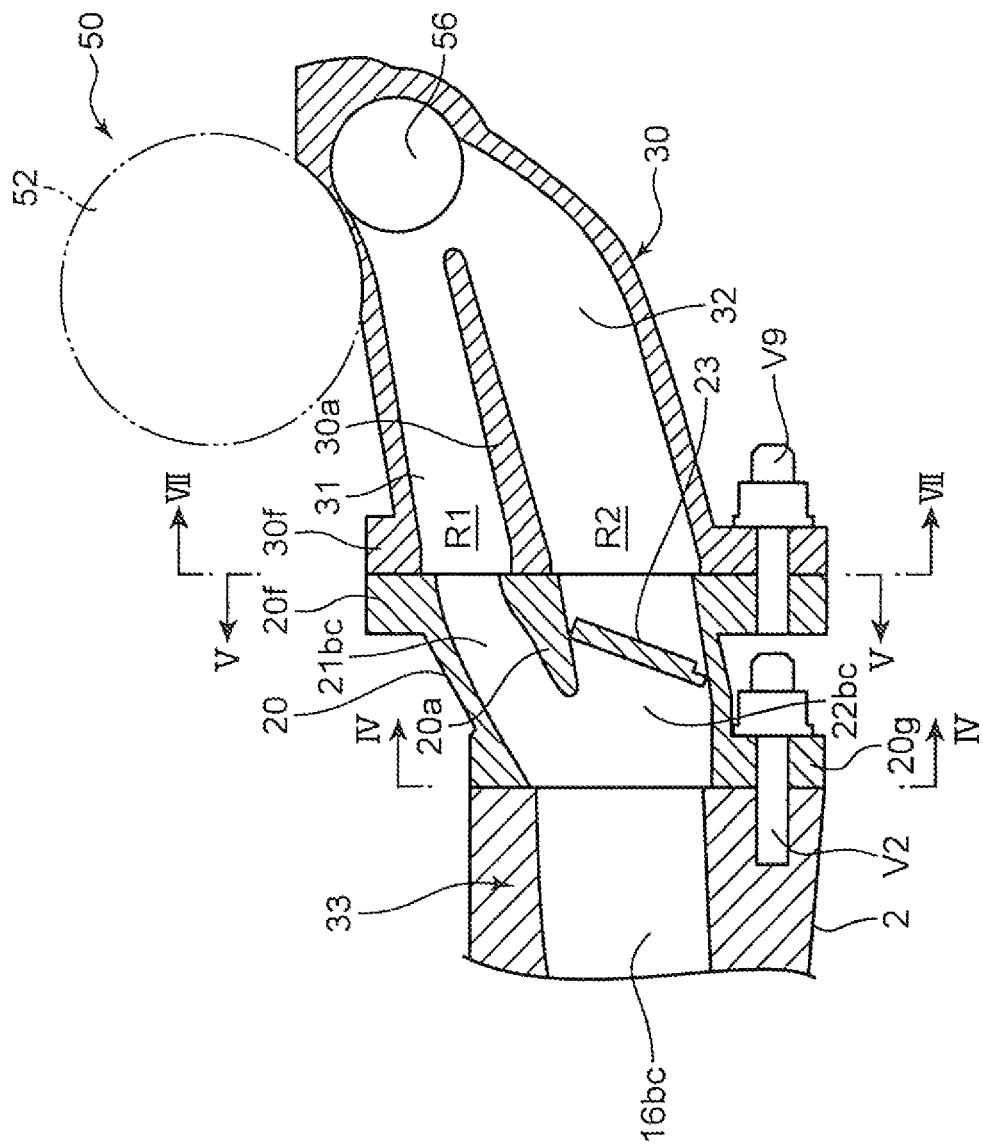
FIG. 3 is a sectional view taken along the line III-III in FIG. 2.

As also illustrated in FIGS. 1-3, the exhaust passage 33 further comprises first to third low-speed passages 21a, 21bc, 21d and first to third high-speed passages 22a, 22bc, 22d, wherein each of the first to third independent exhaust passages 16a, 16bc, 16d has a downstream end connected to an upstream end of a corresponding one of the first to third low-speed passages 21a, 21bc, 21d, and an upstream end of a corresponding one of the first to third high-speed passages 22a, 22bc, 22d. These passages 21a, 21bc, 21d, 22a, 22bc, 22d are formed in the exhaust manifold 20. The passages 21a, 21bc, 21d, 22a, 22bc, 22d are equivalent to "sub-region passing through an exhaust manifold" set forth in the appended claims. The exhaust manifold 20 is joined to the cylinder head 2 by aftermentioned first to fifth stud bolts and nuts V1 to V5.

Figure 4:
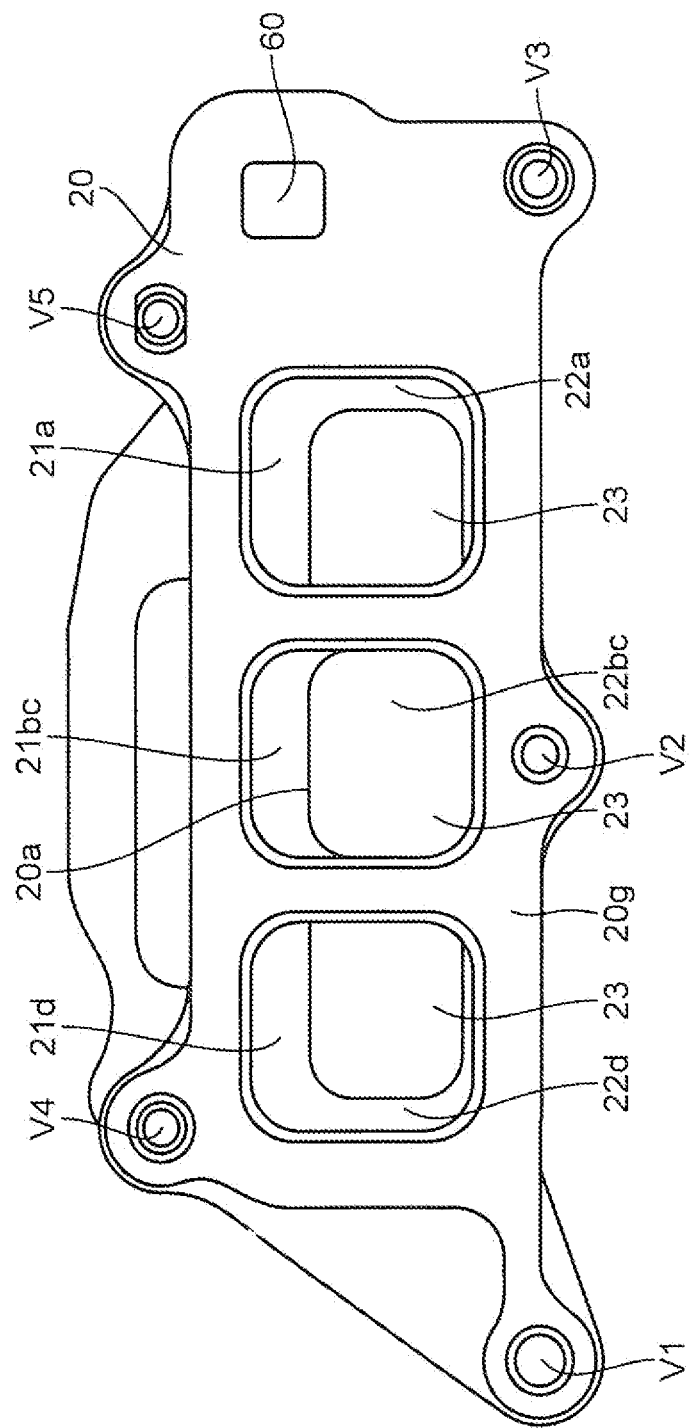
FIG. 4 is an end view of the exhaust manifold when viewed from the side of the cylinder head, along the line IV-IV in FIG. 3.
Figure 5:
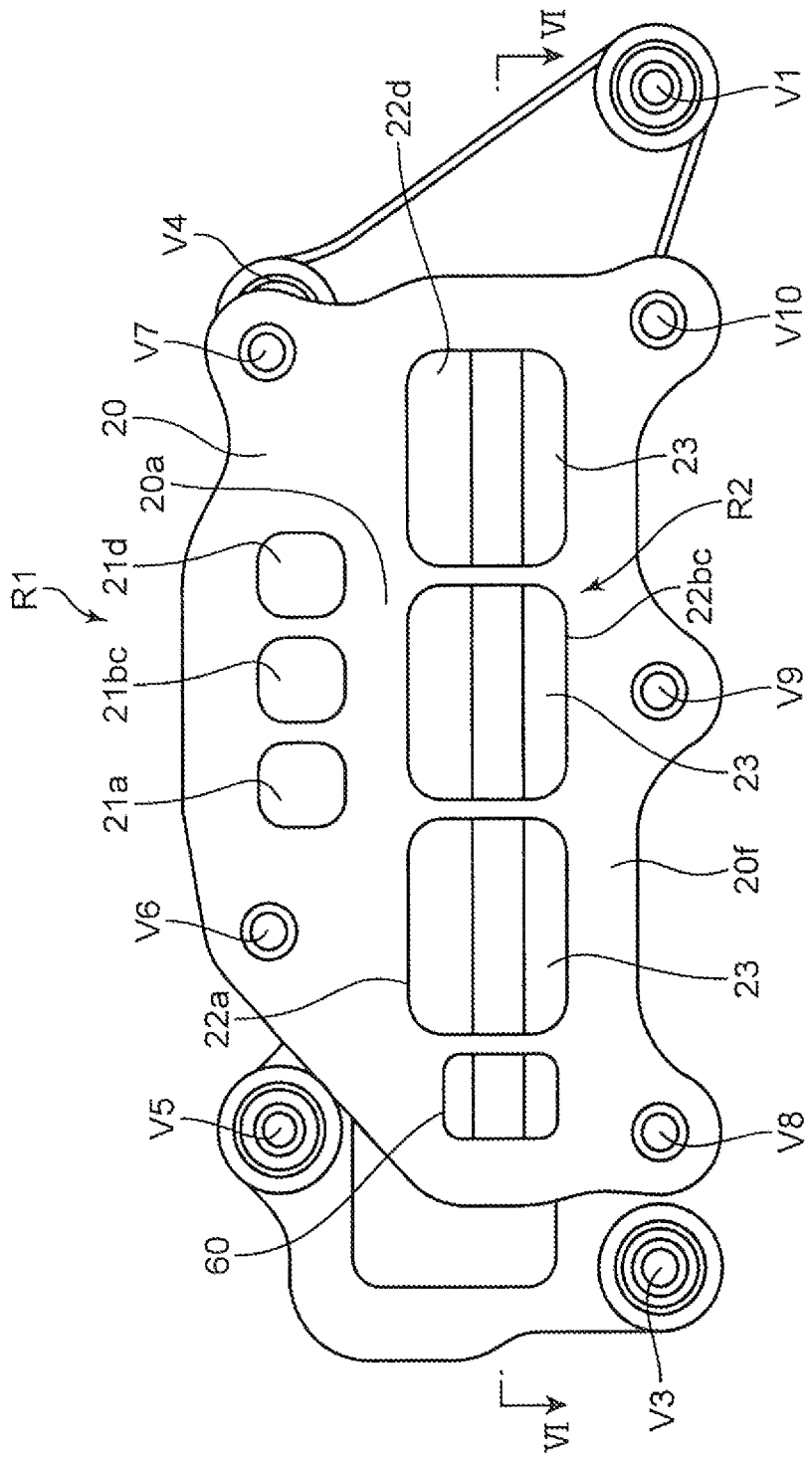
FIG. 5 is an end view of the exhaust manifold when viewed from the side of the turbocharger casing, along the line V-V in FIG. 3.

As also illustrated in FIGS. 4 and 5, each of the first to third low-speed passages 21a, 21bc, 21d and a corresponding one of the first to third high-speed passages 22a, 22bc, 22d are formed, respectively, as upper and lower sub-passages divided by a partition wall 20a extending along an exhaust gas flow direction. The upper sub-passage, i.e., each of the first to third low-speed passages 21a, 21bc, 21d, is set to have an exhaust gas flow area less than that of the lower sub-passage, i.e., a corresponding one of the first to third high-speed passages 22a, 22bc, 22d.

Figure 6:
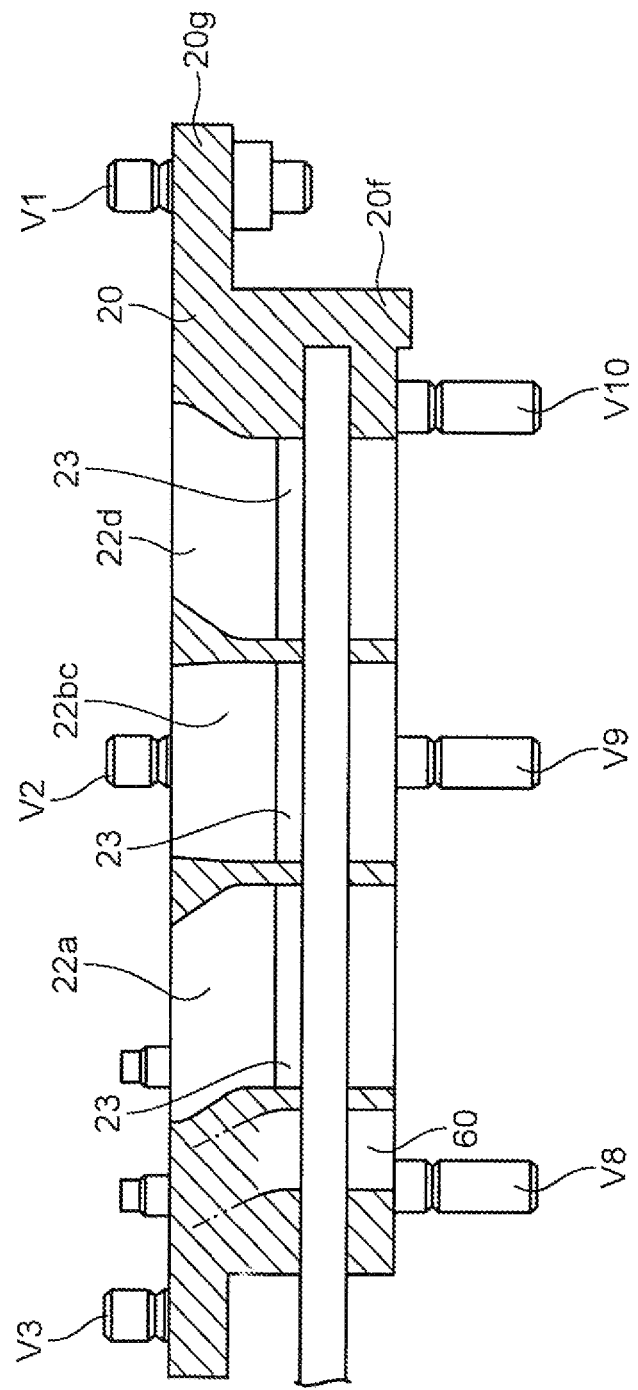
FIG. 6 is a sectional view illustrating a high-speed passage in the exhaust manifold, taken along the line VI-VI in FIG. 5.

Specifically, as illustrated in FIG. 2, each of the first to third low-speed passages 21a, 21bc, 21d has a downstream end formed in a constricted shape to reduce the exhaust gas flow area. On the other hand, as illustrated in FIG. 6, each of the first to third high-speed passages 22a, 22bc, 22d has a downstream end formed in a non-constricted shape.

As illustrated in FIG. 2, the first to third low-speed passages 21a, 21bc, 21d are formed in such a manner that the downstream ends thereof get closer to each other toward a center of a cylinder row length of the engine body in the cylinder row direction (toward an engine center). Similarly, as illustrated in FIG. 6, the first to third high-speed passages 22a, 22bc, 22d are arranged such that the downstream ends thereof get closer to each other toward the engine center.

As illustrated in FIGS. 3 to 6, an exhaust variable valve 23 is provided in the first to third high-speed passages 22a, 22bc, 22d. The exhaust variable valve 23 is controlled to be driven to open the first to third high-speed passages 22a, 22bc, 22d by a controller (not shown) when an engine speed is equal to or greater than an intercept speed, and to close the first to third high-speed passages 22a, 22bc, 22d when the engine speed is less than the intercept speed. The intercept speed means a value of the engine speed corresponding to an intercept point, wherein the intercept point means a point on a full-load line, and a point at which a boost pressure to be produced by the compressor 53 of the turbocharger 50 reaches a predetermined upper limit. When the boost pressure reaches the upper limit, a control operation of opening a wastegate valve 56 to allow a part of exhaust gas to flow through a wastegate passage 55 (to bypass the turbine 52) is performed in order to prevent any further rise in the boost pressure. It is to be understood that this wastegate control may be performed while taking into account not only the engine speed but also an engine load. For example, the wastegate control may be performed in a low-speed and high-load region.

As illustrated in FIGS. 2 and 3, the exhaust passage 33 further comprises: a low-speed exhaust gas introduction passage 31 having an upstream end connected to the downstream ends of the first to third low-speed passages 21*a*, 21*bc*, 21*d*; and a high-speed exhaust gas introduction passage 32 having an upstream end connected to the downstream ends of the first to third high-speed passages 22*a*, 22*bc*, 22*d*. These passages 31, 32 are formed in the turbocharger casing 30. The turbocharger casing 30 is joined to the exhaust manifold 20 by aftermentioned sixth to tenth stud bolts and nuts V6 to V10.

As illustrated in FIGS. 3 and 7, the low-speed exhaust gas introduction passage 31 and the high-speed exhaust gas introduction passage 32 are formed, respectively, as upper and lower sub-passages divided by a partition wall 30*a* extending along the exhaust gas flow direction. The upper sub-passage, i.e., the low-speed exhaust gas introduction passage 31, is set to have an exhaust gas flow area less than that of the lower sub-passage, i.e., the high-speed exhaust gas introduction passage 32.

Each of the exhaust gas introduction passages 31, 32 is designed to introduce exhaust gas from the engine body, to the turbine 52 of the turbocharger 50, and arranged to extend from the turbine housing 52*a* housing the turbine 52 toward the engine body (see FIG. 7).

The low-speed exhaust gas introduction passage 31 is a common passage communicating with the respective downstream ends of the first to third low-speed passages 21*a*, 21*bc*, 21*d*, and the high-speed exhaust gas introduction passage 32 is a common passage communicating with the respective downstream ends of the first to third high-speed passages 22*a*, 22*bc*, 22*d*.

As illustrated in FIG. 7, each of the low-speed exhaust gas introduction passage 31 and the high-speed exhaust gas introduction passage 32 is formed in such a manner that an end thereof on the side of the engine body is increased in width in the cylinder row direction.

As illustrated in FIG. 3, when the exhaust variable valve 23 is closed, exhaust gas is introduced to the turbine 52 through the first to third low-speed passages 21*a*, 21*bc*, 21*d* and the low-speed exhaust gas introduction passage 31. On the other hand, when the exhaust variable valve 23 is opened, exhaust gas is introduced to the turbine 52 through the first to third low-speed passages 21*a*, 21*bc*, 21*d*, the first to third high-speed passages 22*a*, 22*bc*, 22*d*, the low-speed exhaust gas introduction passage 31 and the high-speed exhaust gas introduction passage 32. That is, the first to third low-speed passages 21*a*, 21*bc*, 21*d* and the low-speed exhaust gas introduction passage 31 is a low-speed sub-passage (assigned with a code R1) for allowing exhaust gas to pass therethrough, regardless of the engine speed, and the first to third high-speed passages 22*a*, 22*bc*, 22*d* and the high-speed exhaust gas introduction passage 32 is a high-speed sub-passage (assigned with a code R2) for allowing exhaust gas to pass therethrough only when the engine speed is equal to or greater than the intercept speed.

The low-speed sub-passage R1, i.e., the first to third low-speed passages 21*a*, 21*bc*, 21*d* and the low-speed exhaust gas introduction passage 31, and the high-speed sub-passage R2, i.e., the first to third high-speed passages 22*a*, 22*bc*, 22*d* and the high-speed exhaust gas introduction passage 32, are equivalent to "two sub-passages" set forth in the appended claims. Among them, the high-speed sub-passage R2 is equivalent to "the one sub-passage" set forth in the appended claims.

Thus, in a low-speed region where the engine speed is less than the intercept speed, a flow rate of exhaust gas discharged just after opening of the pair of exhaust valves 8 of the cylinder 4 (blowdown gas) in the first to third low-speed passages 21*a*, 21*bc*, 21*d* and the low-speed exhaust gas introduction passage 31 (i.e., in the low-speed sub-passage R1) is increased by a value corresponding to a reduction in exhaust gas flow area of the low-speed sub-passage R1, i.e., the first to third low-speed passages 21*a*, 21*bc*, 21*d* and the low-speed exhaust gas introduction passage 31, so that a pressure of exhaust gas applied to the turbine 52 is increased. That is, a blowdown turbocharging effect is enhanced.

Further, in the low-speed region where the engine speed is less than the intercept speed, in addition to an increase in flow rate of blowdown gas in the first to third low-speed passages 21*a*, 21*bc*, 21*d*, by a value corresponding to a reduction in exhaust gas flow area of the first to third low-speed passages 21*a*, 21*bc*, 21*d* and the low-speed exhaust gas introduction passage 31, a velocity of exhaust gas ejected from the downstream ends of the first to third low-speed passages 21*a*, 21*bc*, 21*d* into the low-speed exhaust gas introduction passage 31 is increased by a value corresponding to a constriction in the downstream ends of the first to third low-speed passages 21*a*, 21*bc*, 21*d*, and a negative pressure to be generated in the low-speed exhaust gas introduction passage 31 is increased by a value corresponding to a reduction in exhaust gas flow area of the low-speed exhaust gas introduction passage 31, so that scavenging of residual gas in the cylinder 4 is facilitated. That is, an ejector effect is enhanced.

Returned to FIG. 1, the exhaust passage 33 is provided with the wastegate passage 55 bypassing the turbine 52 of the turbocharger 50, and the wastegate valve 56 for opening and closing the wastegate passage 55.

In order to perform exhaust gas recirculation intended to recirculate, to the intake passage 10, a part of exhaust gas flowing through the exhaust passage 33, the engine 1 further comprises an EGR passage 60 for communicating between the exhaust passage 33 and the intake passage 10. An inlet 60*a* of the EGR passage 60 on the side of the exhaust passage 33 (see FIGS. 2 and 7) is opened to the high-speed exhaust gas introduction passage 32 at a position downstream of the exhaust variable valve 23. An outlet 60*b* of the EGR passage 60 on the side of the intake passage 10 is opened to an intake passage 10 at a position between the throttle valve 12 and the surge tank 13. The EGR passage 60 is equipped with an EGR cooler 61 for cooling gas passing through the EGR passage 60, and an EGR valve 62 for opening and closing the EGR passage 60. In this embodiment, an upstream region of the EGR passage 60 is formed in respective walls of the exhaust manifold 20 and the cylinder head 2.

Figure 8:
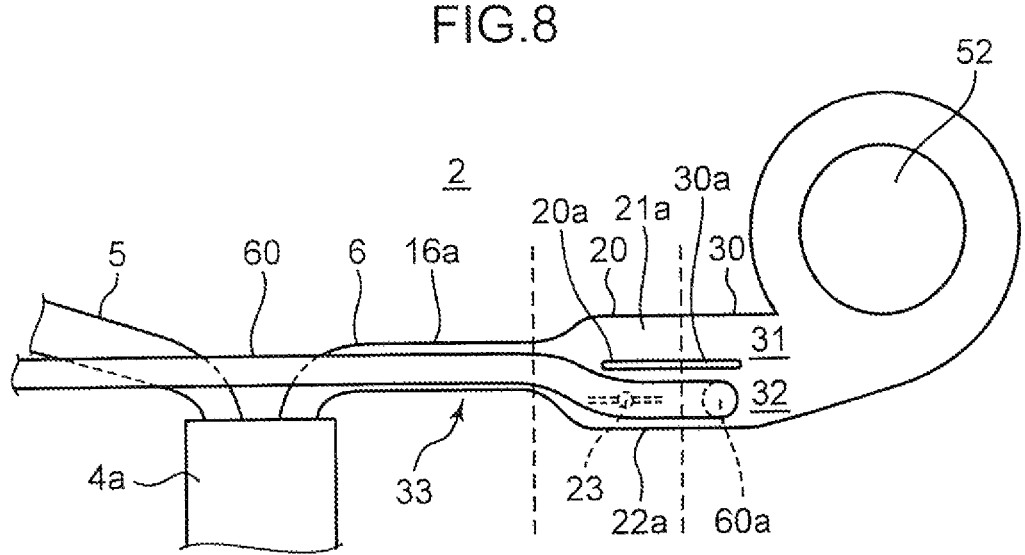
FIG. 8 is a schematic diagram of the EGR passage when viewed from the side of the engine.
Figure 9:
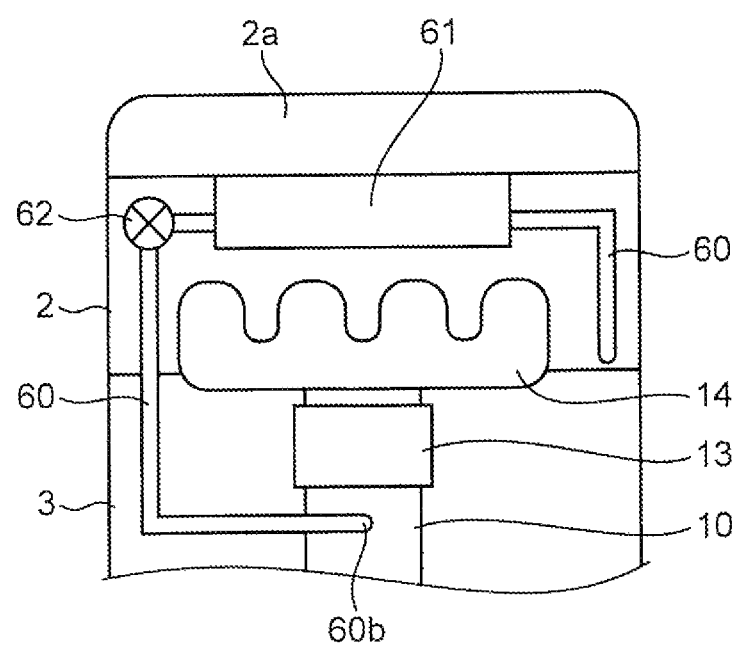
FIG. 9 is a schematic diagram of the EGR passage when viewed from the side of an intake system.

FIG. 8 is a schematic diagram of the EGR passage 60 when viewed from the side of the engine (from a lower side in FIG. 1), and FIG. 9 is a schematic diagram of the EGR passage 60 when viewed from the side of an intake system (from a left side in FIG. 1).

As illustrated in FIGS. 1, 8 and 9, the exhaust passage 33 is equipped with the turbine 52 of the turbocharger 50, and at least a downstream sub-region of a region of the exhaust passage 33 upstream of the turbine 52 is divided into two sub-passages consisting of the low-speed sub-passage R1 (21*a*, 21*bc*, 21*d*, 31) and the high-speed sub-passage R2 (22*a*, 22*bc*, 22*d*, 32), by the partition walls 20*a*, 30*a* extending along the exhaust gas flow direction, wherein the high-speed sub-passage R2 (22*a*, 22*bc*, 22*d*, 32) in the two sub-passages R1, R2 is equipped with the openable-closable exhaust variable valve 23 which is configured to be controlled to open the high-speed sub-passage R2 (22*a*, 22*bc*, 22*d*, 32) when the engine speed is equal to or greater than the intercept speed, and close the high-speed sub-passage R2 (22*a*, 22*bc*, 22*d*, 32) when the engine speed is less than the intercept speed, and wherein the inlet 60a of the EGR passage 60 on the side of the exhaust passage 33 is opened to the high-speed sub-passage R2 (22a, 22bc, 22d, 32) at a position downstream of the exhaust variable valve 23.

The EGR passage 60 is arranged to extend from the inlet 60a on the side of the exhaust passage 33 to the outlet 60b on the side of the intake passage 10, and equipped with the EGR cooler 61 and the EGR valve 62 in this order between the inlet 60a and the outlet 60b, wherein the EGR cooler 61 and the EGR valve 62 are provided at an uppermost position of the EGR passage 60 as illustrated in FIG. 9. In FIG. 9, the code 2a indicates a head cover, and the code 3 indicates a cylinder block 3.

The region of the exhaust passage 33 upstream of the turbine 52 has the sub-regions 16a, 16b, 16c, 16d, 16bc passing through the cylinder head 2, and the sub-regions 21a, 21bc, 21d, 22a, 22bc, 22d passing through the exhaust manifold 20 joined to the cylinder head 2, in this order from an upstream side, wherein the inlet 60a of the EGR passage 60 is provided at a position downstream of the sub-regions 22a, 22bc, 22d passing through an exhaust manifold 20, and at least of a part of a region of the EGR passage 60 between the inlet 60a and the EGR cooler 61 is provided in respective walls of the exhaust manifold 20 and the cylinder head 2.

The engine body is provided with an intake-side variable valve timing mechanism 15i and an exhaust-side variable valve timing mechanism 15e. The intake-side (exhaust-side) variable valve timing mechanism 15i (15e) is configured to change opening and closing timings of the pair of intake valves 7 (exhaust valves 8) in each cylinder 4 in a parallel shift manner, while maintaining a valve-open period of the pair of intake valves 7 (exhaust valves 8) constant.

In this embodiment, when the engine speed is less than the intercept speed, i.e., in the low-speed region where the exhaust variable valve 23 is closed, the respective valve-open periods of the pair of intake valves 7 and the pair of exhaust valves 8 in each cylinder 4 are set to overlap each other for a given overlap period, and the pair of exhaust valves 8 in the cylinder 4 are set to start opening within the overlap period in another cylinder 4 having an exhaust stroke one stroke before.

Specifically, as illustrated in FIG. 10, the pair of exhaust valves 8 of the third cylinder 4c start opening within an overlap period (T_O/L) between the pair of intake valves 7 and the pair of exhaust valves 8 in the first cylinder 4a, and the pair of exhaust valves 8 of the fourth cylinder 4d start opening within an overlap period (T_O/L) between the pair of intake valves 7 and the pair of exhaust valves 8 in the third cylinder 4c. Further, the pair of exhaust valves 8 of the second cylinder 4b start opening within an overlap period (T_O/L) between the pair of intake valves 7 and the pair of exhaust valves 8 in the fourth cylinder 4d, and the pair of exhaust valves 8 of the first cylinder 4a start opening within an overlap period (T_O/L) between the pair of intake valves 7 and the pair of exhaust valves 8 in the second cylinder 4b.

As illustrated in FIGS. 3, 4 and 6, the exhaust manifold 20 has an installation flange 20g provided at one end thereof on the side of the cylinder head 2 to face the cylinder head 2. The exhaust manifold 20 is installed to the cylinder head 2 through the installation flange 20g. Specifically, as illustrated in FIG. 4, the installation flange 20g is provided with first to fifth bolt insertion holes V1 to V5, and the exhaust manifold 20 is installed to the cylinder head 2 by inserting five stud bolts attached to the cylinder head 2, into respective ones of the bolt insertion holes V1 to V5, and fastening the stud bolts by nuts. In this embodiment, the codes V1 to V5 are used to indicate not only the first to fifth bolt insertion holes, but also first to fifth stud bolts and nuts to be inserted into and screwed onto respective ones of the first to fifth bolt insertion holes.

As illustrated in FIGS. 3, 5 and 6, the exhaust manifold 20 further has an installation flange 20f provided at the other end on the side of the turbocharger casing 30 to face the turbocharger casing 30. Correspondingly, as illustrated in FIGS. 3 and 7, the turbocharger casing 30 has an installation flange 30f provided at one end thereof on the side of the exhaust manifold 20 to face the exhaust manifold 20. The turbocharger casing 30 is installed to the exhaust manifold 20 through the installation flange 30f. Specifically, as illustrated in FIG. 7, the installation flange 30f is provided with sixth to tenth bolt insertion holes V6 to V10, and the turbocharger casing 30 is installed to the exhaust manifold 20 by inserting five stud bolts (see FIG. 5) attached to the installation flange 20f of the exhaust manifold 20, into respective ones of the bolt insertion holes V6 to V10, and fastening the stud bolts by nuts. In this embodiment, the codes V6 to V10 are used to indicate not only the sixth to tenth bolt insertion holes, but also sixth to tenth stud bolts and nuts to be inserted into and screwed onto respective ones of the sixth to tenth bolt insertion holes.

In this embodiment, the installation flange 30f is provided on an engine body-side end of the exhaust gas introduction passages 31, 32, to serve as an installation portion for installing the turbocharger 50 to the engine body. The sixth to tenth stud bolts and nuts V6 to V10 serve as a fastening member for installing the turbocharger 50 to the engine body. The sixth to tenth bolt insertion holes V6 to V10 are provided in the installation flange 30f to serve as a mounting portion for allowing the sixth to tenth stud bolts and nuts V6 to V10 to be mounted thereto.

(2) Functions, etc.

As above, in an exhaust gas recirculation system for the engine 1, in which the EGR passage 60 is provided to communicate between the exhaust passage 33 and the intake passage 10 and allow a part of exhaust gas flowing through the exhaust passage 33 to be recirculated to the intake passage 10 therethrough, wherein the exhaust passage 33 is equipped with the turbine wheel 52 of the turbocharger 50, the above embodiment employs the following feature.

At least a downstream sub-region of a region of the exhaust passage 33 upstream of the turbine 52 is divided into two sub-passages consisting of the low-speed sub-passage R1 (21a, 21bc, 21d, 31) and the high-speed sub-passage R2 (22a, 22bc, 22d, 32), by the partition walls 20a, 30a extending along the exhaust gas flow direction, wherein the high-speed sub-passage R2 (22a, 22bc, 22d, 32) in the two sub-passages R1, R2 is equipped with the openable-closable exhaust variable valve 23 which is configured to be controlled to open the high-speed sub-passage R2 (22a, 22bc, 22d, 32) when the engine speed is equal to or greater than the intercept speed, and close the high-speed sub-passage R2 (22a, 22bc, 22d, 32) when the engine speed is less than the intercept speed, and wherein the inlet 60a of the EGR passage 60 on the side of the exhaust passage 33 is opened to the high-speed sub-passage R2 (22a, 22bc, 22d, 32) at a position downstream of the exhaust variable valve 23.

According to this feature, at least a downstream sub-region of a region of the exhaust passage 33 upstream of the turbine 52 of the turbocharger 50 is divided into two sub-passages R1, R2 by the partition walls 20a, 30a, wherein, according to the open-close control of the exhaust variable valve 23 provided in the high-speed sub-passage R2 (22a, 22bc, 22d, 32), the two sub-passages R1, R2 function as the high-speed sub-passage R2 (22a, 22bc, 22d, 32) for allowing exhaust gas to flow therethrough only when the engine speed is equal to or greater than the intercept speed, and the low-speed sub-passage R1 (21*a*, 21*bc*, 21*d*, 31) for allowing exhaust gas to flow therethrough, regardless of the engine speed.

Then, the inlet 60*a* of the EGR passage 60 on the side of the exhaust passage 33 is opened to the high-speed sub-passage R2 (22*a*, 22*bc*, 22*d*, 32) at a position downstream of the exhaust variable valve 23. Thus, when the exhaust variable valve 23 is closed, i.e., in the low-speed region, exhaust gas flowing through only the low-speed sub-passage R1 (21*a*, 21*bc*, 21*d*, 31) is less likely to be expanded by the EGR passage 60 because it is opened the high-speed sub-passage R2 (22*a*, 22*bc*, 22*d*, 32) at a position downstream of the exhaust variable valve 23. Therefore, although the inlet 60*a* of the EGR passage 60 is opened to the exhaust passage 33 at a position upstream of the turbine 52 of the turbocharger 50, it becomes possible to, in the low-speed region where an amount of exhaust gas to be supplied to the turbine 52 is relatively small, suppress a lowering in pressure of exhaust gas to be supplied to the turbine 52, thereby suppressing a lowering in turbine driving force.

On the other hand, when the exhaust variable valve 23 is opened, i.e., in the high-speed region, an amount of exhaust gas to be supplied to the turbine 52 is relatively large, and thereby a pressure upstream of the turbine 52 is sufficiently high. Thus, although a part of exhaust gas flows into the EGR passage 60, a pressure of exhaust gas to be supplied to the turbine 52 can be ensured, while sufficiently ensuring an amount of EGR gas to satisfactorily perform EGR.

In the above embodiment, the EGR passage 60 is arranged to extend from the inlet 60*a* on the side of the exhaust passage 33 to the outlet 60*b* on the side of the intake passage 10, and equipped with the EGR cooler 61 and the EGR valve 62 in this order between the inlet 60*a* and the outlet 60*b*, wherein the EGR cooler 61 and the EGR valve 62 are provided at an uppermost position of the EGR passage 60.

According to this feature, it becomes possible to suppress a situation where condensed water produced during cooling of EGR gas flowing through the EGR passage 60 is accumulated in the EGR cooler 61 and the EGR valve 62. This makes it possible to suppress a situation where soot contained in EGR gas mixed with the condensed water adheres to a wall surface of the EGR passage 60, thereby suppressing negative impacts on cooling efficiency of the EGR cooler 61, and opening and closing movements of the EGR valve 62.

In the above embodiment, the region of the exhaust passage 33 upstream of the turbine 52 has the sub-regions 16*a*, 16*b*, 16*c*, 16*d*, 16*bc* passing through the cylinder head 2, and the sub-regions 21*a*, 21*bc*, 21*d*, 22*a*, 22*bc*, 22*d* passing through the exhaust manifold 20 joined to the cylinder head 2, in this order from an upstream side, wherein the inlet 60*a* of the EGR passage 60 is provided at a position downstream of the sub-regions 22*a*, 22*bc*, 22*d* passing through an exhaust manifold 20, and at least of a part of a region of the EGR passage 60 between the inlet 60*a* and the EGR cooler 61 is provided in respective walls of the exhaust manifold 20 and the cylinder head 2.

According to this feature, at least of a part of a region of the EGR passage 60 between the inlet 60*a* of the EGR passage 60 on the side of the exhaust passage 33 and the EGR cooler 61 is provided in respective walls of the exhaust manifold 20 and the cylinder head 2 through which the exhaust passage 33 passes, so that it becomes possible to suppress a situation where EGR gas flowing through the EGR passage 60 is cooled in the region. This makes it possible to suppress a situation where soot contained in EGR gas mixed with the condensed water adheres to a wall surface of the EGR passage 60 in the region, thereby suppressing a reduction in EGR gas flow area of the EGR passage 60 (an increase in flow resistance of the EGR passage 60).

It is to be understood that the number of the mounting portions (bolt insertion holes) or the fastening members (stud bolts and nuts) is not limited to a specific value.

Further, the fastening member is not limited to a combination of a bolt and a nut, but any other suitable fastening member may be used.

[Outline Of The Embodiment]

Lastly, the features disclosed in the above embodiment, and functions/advantages based thereon will be outlined below.

The technique disclosed in the above embodiment relates to an exhaust gas recirculation system for an engine, in which an EGR passage is provided to communicate between an exhaust passage and an intake passage and allow a part of exhaust gas flowing through the exhaust passage to be recirculated to the intake passage therethrough, wherein the exhaust passage is equipped with a turbine wheel of a turbocharger. At least a downstream sub-region of a region of the exhaust passage upstream of the turbine wheel is divided into two sub-passages by a partition wall extending along an exhaust gas flow direction. One of the two sub-passages is equipped with an openable-closable exhaust variable valve. The exhaust variable valve is configured to be controlled to open the one sub-passage when an engine speed is equal to or greater than a reference speed, and close the one sub-passage when the engine speed is less than the reference speed. An inlet of the EGR passage on the side of the exhaust passage is opened to the one sub-passage at a position downstream of the exhaust variable valve.

In this system, at least a downstream sub-region of a region of the exhaust passage upstream of the turbine wheel of the turbocharger is divided into two sub-passages by a partition wall, wherein, according to the open-close control of the exhaust variable valve provided in the one sub-passage, the two sub-passages function as a high-speed sub-passage (the one sub-passage) for allowing exhaust gas to flow therethrough only when the engine speed is equal to or greater than the reference speed, and a low-speed sub-passage (the other sub-passage) for allowing exhaust gas to flow therethrough, regardless of the engine speed.

Then, the inlet of the EGR passage on the side of the exhaust passage is opened to the high-speed sub-passage at a position downstream of the exhaust variable valve. Thus, when the exhaust variable valve is closed, i.e., in the low-speed region, exhaust gas flowing through only the low-speed sub-passage is less likely to be expanded by the EGR passage because it is opened the high-speed sub-passage at a position downstream of the exhaust variable valve. Therefore, although the inlet of the EGR passage is opened to the exhaust passage at a position upstream of the turbine wheel of the turbocharger, it becomes possible to, in the low-speed region where an amount of exhaust gas to be supplied to the turbine wheel is relatively small, suppress a lowering in pressure of exhaust gas to be supplied to the turbine wheel, thereby suppressing a lowering in turbine driving force.

On the other hand, when the exhaust variable valve is opened, i.e., in the high-speed region, an amount of exhaust gas to be supplied to the turbine wheel is relatively large, and thereby a pressure upstream of the turbine wheel is sufficiently high. Thus, although a part of exhaust gas flows into the EGR passage, a pressure of exhaust gas to be supplied to the turbine wheel can be ensured, while sufficiently ensuring an amount of EGR gas to satisfactorily perform EGR.

Preferably, in the system, the EGR passage is arranged to extend from the inlet on the side of the exhaust passage to an outlet on the side of the intake passage, and equipped with an EGR cooler and an EGR valve in this order between the inlet and the outlet, wherein the EGR cooler and the EGR valve are provided at an uppermost position of the EGR passage.

According to this feature, it becomes possible to suppress a situation where condensed water produced during cooling of EGR gas flowing through the EGR passage is accumulated in the EGR cooler and the EGR valve. This makes it possible to suppress a situation where soot contained in EGR gas mixed with the condensed water adheres to a wall surface of the EGR passage, thereby suppressing negative impacts on cooling efficiency of the EGR cooler, and opening and closing movements of the EGR valve.

Preferably, in the system, the region of the exhaust passage upstream of the turbine wheel has a sub-region passing through a cylinder head, and a sub-region passing through an exhaust manifold joined to the cylinder head, in this order from an upstream side, wherein the inlet of the EGR passage is provided at a position downstream of the sub-region passing through the exhaust manifold, and at least of a part of a region of the EGR passage between the inlet and the EGR cooler is provided in respective walls of the exhaust manifold and the cylinder head.

According to this feature, at least of a part of a region of the EGR passage between the inlet of the EGR passage on the side of the exhaust passage and the EGR cooler is provided in respective walls of the exhaust manifold and the cylinder head through which the exhaust passage passes, so that it becomes possible to suppress a situation where EGR gas flowing through the EGR passage is cooled in the region. This makes it possible to suppress a situation where soot contained in EGR gas mixed with the condensed water adheres to a wall surface of the EGR passage in the region, thereby suppressing a reduction in EGR gas flow area of the EGR passage (an increase in flow resistance of the EGR passage).

The technique disclosed in the above embodiment provides an exhaust gas recirculation system for an engine, capable of suppressing a lowering in turbine driving force.

What is claimed is:

1. An exhaust gas recirculation system for an engine, in which an EGR passage is provided to communicate between an exhaust passage and an intake passage and allow a part of exhaust gas flowing through the exhaust passage to be recirculated to the intake passage therethrough, wherein characterized in that:
    the exhaust passage is equipped with a turbine wheel of a turbocharger; and
    at least a downstream sub-region of a region of the exhaust passage upstream of the turbine wheel is divided into two sub-passages by a partition wall extending along an exhaust gas flow direction,
    wherein one of the two sub-passages is equipped with an openable-closable exhaust variable valve operated by a controller, the exhaust variable valve being configured to be controlled to open the one sub-passage when an engine speed is equal to or greater than a reference speed, and close the one sub-passage when the engine speed is less than the reference speed,
    and wherein an inlet of the EGR passage on the side of the exhaust passage is opened to the one sub-passage at a position downstream of the exhaust variable valve.

2. The exhaust gas recirculation system as defined in claim 1, wherein the EGR passage is arranged to extend from the inlet on the side of the exhaust passage to an outlet on the side of the intake passage, and equipped with an EGR cooler and an EGR valve in this order between the inlet and the outlet, wherein the EGR cooler and the EGR valve are provided at an uppermost position of the EGR passage.

3. The exhaust gas recirculation system as defined in claim 2, wherein the region of the exhaust passage upstream of the turbine wheel has a sub-region passing through a cylinder head, and a sub-region passing through an exhaust manifold joined to the cylinder head, in this order from an upstream side, wherein:
    the inlet of the EGR passage is provided at a position downstream of the sub-region passing through the exhaust manifold; and
    at least of a part of a region of the EGR passage between the inlet and the EGR cooler is provided in respective walls of the exhaust manifold and the cylinder head.

4. The exhaust gas recirculation system as defined in claim 2, wherein the region of the exhaust passage upstream of the turbine wheel has a sub-region passing through a cylinder head, and a sub-region passing through an exhaust manifold joined to the cylinder head, in this order from an upstream side, wherein:
    the inlet of the EGR passage is provided at a position downstream of the sub-region passing through the exhaust manifold; and
    at least of a part of a region of the EGR passage between the inlet and the EGR cooler is provided in respective walls of the exhaust manifold and the cylinder head.

5. The exhaust gas recirculation system as defined in claim 2, wherein the region of the exhaust passage upstream of the turbine wheel has a sub-region passing through a cylinder head, and a sub-region passing through an exhaust manifold joined to the cylinder head, in this order from an upstream side, wherein:
    the inlet of the EGR passage is provided at a position downstream of the sub-region passing through the exhaust manifold; and
    at least of a part of a region of the EGR passage between the inlet and the EGR cooler is provided in respective walls of the exhaust manifold and the cylinder head.

6. The exhaust gas recirculation system as defined in claim 1, wherein the EGR passage is arranged to extend from the inlet on the side of the exhaust passage to an outlet on the side of the intake passage, and equipped with an EGR cooler and an EGR valve in this order between the inlet and the outlet, wherein the EGR cooler and the EGR valve are provided at an uppermost position of the EGR passage.

7. The exhaust gas recirculation system as defined in claim 1, wherein the EGR passage is arranged to extend from the inlet on the side of the exhaust passage to an outlet on the side of the intake passage, and equipped with an EGR cooler and an EGR valve in this order between the inlet and the outlet, wherein the EGR cooler and the EGR valve are provided at an uppermost position of the EGR passage.

8. An exhaust gas recirculation system for an engine, in which an EGR passage is provided to communicate between an exhaust passage and an intake passage and allow a part of exhaust gas flowing through the exhaust passage to be recirculated to the intake passage therethrough, wherein characterized in that:
    the exhaust passage is equipped with a turbine wheel of a turbocharger; and
    at least a downstream sub-region of a region of the exhaust passage upstream of the turbine wheel is divided into two sub-passages,
    wherein one of the two sub-passages is equipped with an openable-closable exhaust variable valve operated by a controller, the exhaust variable valve being configured to be controlled to open the one sub-passage when an engine speed is equal to or greater than a reference speed, and close the one sub-passage when the engine speed is less than the reference speed, and the exhaust gas flow through an other one of the two sub-passages is not blocked by opening and closing of the exhaust variable valve, and wherein an inlet of the EGR passage on the side of the exhaust passage is opened to the one sub-passage at a position downstream of the exhaust variable valve.

9. An exhaust gas recirculation system for an engine, in which an EGR passage is provided to communicate between an exhaust passage and an intake passage and allow a part of exhaust gas flowing through the exhaust passage to be recirculated to the intake passage therethrough, wherein characterized in that:

the exhaust passage is equipped with a turbine wheel of a turbocharger; and at least a downstream sub-region of a region of the exhaust passage upstream of the turbine wheel is divided into a first sub-passage and a second sub-passage by a partition wall extending along an exhaust gas flow direction, the partition wall including a first, upstream end positioned at a first upstream end of the first sub-passage and a first upstream end of the second sub-passage, and a second, downstream end positioned at a second downstream end of the first sub-passage and a second downstream end of the second sub-passage, wherein one of the two sub-passages is equipped with an openable-closable exhaust variable valve operated by a controller, the exhaust variable valve being configured to be controlled to open the first sub-passage when an engine speed is equal to or greater than a reference speed, and close the first sub-passage when the engine speed is less than the reference speed, and wherein an inlet of the EGR passage on the side of the exhaust passage is opened to the first sub-passage at a position downstream of the exhaust variable valve.

* * * * *